United States Patent [19]

Bogner

[11] Patent Number: 4,474,636

[45] Date of Patent: Oct. 2, 1984

[54] FABRICATION OF COMPOSITE ARTICLES

[75] Inventor: Ben R. Bogner, Wheaton, Ill.

[73] Assignee: QO Chemicals, Inc., Chicago, Ill.

[21] Appl. No.: 490,040

[22] Filed: Apr. 29, 1983

Related U.S. Application Data

[62] Division of Ser. No. 318,958, Nov. 6, 1981, Pat. No. 4,439,568.

[51] Int. Cl.³ .............................................. C09J 5/00
[52] U.S. Cl. .................................. 156/327; 156/62.2; 156/307.3; 264/112; 264/128; 264/258; 428/325; 428/326; 524/111; 526/270; 528/249; 528/417; 549/483

[58] Field of Search ................ 524/111; 525/414, 472; 528/249, 417; 428/325, 326; 264/112, 258, 128; 156/62.2, 327, 307.3; 549/483; 526/270

[56] References Cited

U.S. PATENT DOCUMENTS

| 2,345,966 | 4/1944 | Fiedler et al. | 526/270 |
| 2,776,948 | 1/1957 | Snyder | 549/483 |
| 3,487,043 | 12/1969 | Grudus | 526/270 |

Primary Examiner—John J. Gallagher
Attorney, Agent, or Firm—Neuman, Williams, Anderson & Olson

[57] ABSTRACT

In the fabrication of composite articles, a binder containing hydroxymethylfurfural is employed.

3 Claims, No Drawings

FABRICATION OF COMPOSITE ARTICLES

This is a division of application Ser. No. 318,958 filed Nov. 6, 1981, now U.S. Pat. No. 4,439,568.

This invention relates to novel binder compositions useful in the fabrication of composite articles such as fiber reinforced composite articles.

Fiber reinforced articles such as glass fiber reinforced furfuryl alcohol resin articles are well known as being particularly desirable for use as vessels, containers and other articles used in systems requiring a high degree of chemical resistance, high strength, structural stability and so forth. Various methods have been used in the fabrication of fiber reinforced articles, including, for example, "hand layup" fabrication and "spray-up" fabrication, as well as others. For example, U.S. Pat. No. 3,850,727 discloses hand layup techniques and U.S. Pat. No. 3,927,139 discloses spray-up techniques for fabricating fiber reinforced composite articles. The disclosures of these two patents are incorporated herein by reference thereto.

In the fabrication of fiber reinforced composite articles, binders, and particularly furan type binders, that is, binders containing derivatives of furan, are used to bind the reinforcing fibers and to impart strength to the composite articles. Dilution of the furan binders with furfural in varying amounts has been found advantageous from the standpoint of increasing corrosion resistance. Dilution of binders with fufural imparts high corrosive resistance characteristics and thus its use has been particularly desirable when the reinforced composite articles are intended to be used under corrosive conditions. However, there has been some objection to the use of furfural-diluted binder systems because of the objectionable odor of furfural and in recent years a desire to avoid human exposure to furfural vapors.

It has now been unexpectedly found that hydroxymethylfurfural can be advantageously used in lieu of furfural in furan binder systems. By "furan binder" is meant a composition prepared from compounds having one or more furan rings therein. The use of hydroxymethylfurfural in such binder systems eliminates the objections associated with use of furfural and thus this discovery is broadly applicable to binders used in various applications. The use of 5-hydroxymethylfurfural in lieu of furfural as a diluent in furan binders results in reinforced composite articles which exhibit greater retention of flexural strength over periods of time than articles produced from furfural-diluted binders in accordance with the prior art. Representative furan binders which are useful in fabricating composite articles include, for example, furfuryl alcohol homopolymer resins, furfuryl alcohol-formaldehyde resins, furfuryl alcohol-furfural-formaldehyde resins, furfuryl alcohol-phenol resins, furfuryl alcohol-urea-formaldehyde resins, furfuryl alcohol-urea-phenol resins and the like. Furan binders for fabricating glass laminates are described in U.S. Pat. Nos. 3,594,345 and 3,681,286, the disclosures of which are incorporated herein. These patents disclose binders comprising furfuryl alcohol-formaldehyde resins having a formaldehyde-furfuryl alcohol ratio of 0.25:1. Most preferred resin binders for fabricating glass-reinforced laminates are furfuryl alcohol homopolymers.

In accordance with this invention, 5-hydroxymethylfurfural is incorporated with a furan binder at a level of about 5–25% and preferably at a level of 5–15% by weight of the binder. The hydroxymethylfurfural is incorporated with the furan binder after pre-polymerization of the furan resins to a desired viscosity. The optimum viscosity for the binder system depends to large extent on the method of fabrication of the reinforced composite articles. Thus, in hand layup fabrication the entire process is basically a batch process in which the layers of resin and reinforcement are applied alternately.

In hand layup work, and in pre-preg techniques, relatively high viscosities are desirable, although the hand layup techniques use resins which are far less viscous than those resins which are left on the reinforcement in the pre-preg techniques.

In hand layup work, however, it is essential that the initial viscosity of the liquid resin be low enough to provide for the formation of a relatively fine spray of catalyzed resin, to provide ready penetration and wetting by the liquid throughout the fibrous reinforcement and to provide minimum tendency of the resin to remain adhering to the roller or other working tool. When the viscosity is too high, the rollers tend to adhere to the resin in the applied reinforcement material-liquid-resin mass, with result that the highly viscous reinforcement material-liquid-resin mass can be disrupted or literally torn apart as the roller is withdrawn therefrom. In addition to developing minimal cohesion between the applied fiber-resin layer and the resin-wetted working roller, the lower viscosity resins enhance the working out of air bubbles from the fiber-resin layer.

On the other hand, relatively high viscosities are desirable inasmuch as less shrinkage is encountered upon cure and more manageable or more tolerable exotherms are usually encountered on the shaping element when higher viscosity resins are employed. Relatively high initial viscosity is characteristic of liquid resins in which the early stage of polymerization has been carried out at least to some extent in a suitable reactor. Naturally, this controlled advancement of the resinification or condensation reaction involves generation and disposition of whatever exotherm is generated during that particular degree of advancement. Consequently, the extent of polymerization or condensation which can be encountered after that resin is catalyzed and applied to the shaping element is diminished by the degree to which the controlled precondensation is carried out in a reactor. Hence, the more advanced resins, that is, resins having high viscosity, relatively speaking, are also characterized as exhibiting diminished exotherm during the course of cure of the fabricated article.

U.S. Pat. Nos. 3,927,139 and 3,850,727 discuss considerations with respect to binder viscosity in relation to methods of fabrication. Obtainment of a particular binder viscosity is not a feature of the present invention and the binder viscosity will be governed primarily by the method of fabrication of the composite articles. Pre-polymerization or pre-resinification of the furan binder using a variety of acid catalysts can be accomplished by known procedures such as described in U.S. Pat. No. 3,927,139. The binder systems disclosed herein are applicable in the production of a wide variety of composite articles in which a binder is commonly employed. Likewise, various methods of fabrication of the composite articles can be utilized as is known in the art and the binder viscosity and its method of application can be varied as is known.

In practice, when the furan binders are used in fabricating composite articles, the binders are generally cured with the aid of a suitable catalyst which is usually an acid catalyst. The choice of catalyst is dependent to large extent on the contemplated method of fabrication of the composite articles. The method of fabrication governs the desired curing time or "bench life" of the catalyzed binder system as discussed in U.S. Pat. No. 3,927,139. Here again, the selection of a particular catalyst to employ with the hydroxymethylfurfural diluted binder is not a feature of the present invention and a catalyst can be routinely selected as is known in the art to provide a catalyzed furan binder system in accordance with this invention. Merely representative of acid catalysts for curing furan binders are toluene sulfonic acid, aniline hydrochloric salts, phenol sulfonic acid, acid chlorides, benzene sulfonic acid, sulfonic acid salts, phthaloyl chloride, hydrochloric acid, phosphoric acid, maleic acid, zinc chloride, sulfuric acid and the like.

The following examples set forth test data which illustrate the advantages of the present invention.

EXAMPLE 1

In obtaining all of the data set forth in the examples, except as hereinafter specified, reinforced glass laminate articles were made from five glass layers, that is, two 10 mil "C" glass chemical resistant surfacing veils at opposite faces and three chopped strand mat layers in between. These reinforced glass laminates were prepared as follows:

Mylar polyester film was supported on a smooth metal surface which serves as the shaping surface. Approximately 1/6 the total amount of catalyzed resin binder was spread on the polyester film. A C-veil was then layed on the resin binder and rolled until it was completely wet with the binder. Then approximately 1/6 of the total amount of catalyzed resin binder was spread over the top of the veil and rolled until uniform. The first ply of chopped fiberglass filler was layed down and rolled until it was completely wet with binder. Approximately ⅓ of the total amount of catalyzed resin binder was spread on the laminate and a second ply of chopped fiberglass was layed down and rolled until all of the filler was wet with binder. Then approximately ⅓ of the total amount of catalyzed binder was spread on the laminate and a third ply of fiberglass filler was layed down and rolled until all of the filler was wet with binder. Finally, the final C-veil layer was added and rolled until no coated fiberglass protruded from the surface and the laminate was uniform. The sheets of laminates were allowed to cure overnight and were subsequently post cured by heating one hour at 140° F., two hours at 180° F. and one hour at 200° F. The post cure was performed to reduce the overall test time and post curing is not necessary in practice. The amount of binder used was approximately three times the weight of fiberglass utilized.

The reinforcement utilized was a fiberglass available commercially from Pittsburgh Plate Glass Company under the trade designation PPG/ABM containing 28% glass fibers by weight.

Binder A comprised a furfuryl alcohol homopolymer diluted with about 19% by weight of furfural and having a viscosity of approximately 600 centipoises when measured on a Brookfield viscometer at 25° C. Binder B comprised a furfuryl alcohol homopolymer diluted with 20% furfuryl alcohol and 10% hydroxymethylfurfural and having a viscosity of about 350 centipoises when measured on a Brookfield viscometer at 55° C. As a catalyst for the resin binder A, o-phthaloyl chloride was used in an amount of 3.25 parts per hundred parts of binder. As a catalyst for the resin binder B, o-phthaloyl chloride was used in an amount of 2.5 parts per hundred parts of binder.

The reinforced glass test laminates were evaluated by Cursory Corrosion Resistance 18 Media at 150° F. (ASTM C-581 procedure). Throughout this application flexural strength reported as pounds per square inch was determined by the procedure of ASTM D-790 and flexural modulus is reported in pounds per square inch.

Initially, glass laminates prepared using Binder A exhibited flexural strength of 20,000 pounds per square inch and a flexural modulus of 727,800 pounds per square inch while the glass laminates prepared by using Binder B exhibited an initial flexural strength of 13,900 pounds per square inch and flexural modulus of 610,000 pounds per square inch.

The results of a 1 year corrosion study are shown in Table I.

TABLE I

| Binder | Expo. | Barcol | R/S | % Wt. Ch. | % Swell | Flex. Str. | % Ret. | Flex. Mod. | % Ret. | Appearance |
|---|---|---|---|---|---|---|---|---|---|---|
| | | | | MEDIA - 25% Sulfuric Acid | | TEMP. 150° F. | | | | |
| A | 1 mo. | 53 | 46 | +0.85 | +0.38 | 16,400 | 82 | 678,100 | 93 | No Change |
| | 3 mo. | 56 | 53 | +1.32 | +0.73 | 13,900 | 69 | 650,000 | 89 | No Change |
| | 6 mo. | 57 | 55 | +1.15 | +0.87 | 14,200 | 71 | 629,000 | 87 | No Change |
| | 1 yr. | 58 | 57 | +2.03 | +1.35 | 14,900 | 75 | 614,000 | 84 | Sl. Blister |
| B | 1 mo. | 50 | 41 | +0.26 | 0 | 16,800 | 121 | 668,700 | 110 | No Change |
| | 3 mo. | 54 | 47 | +0.35 | −0.28 | 15,600 | 112 | 666,100 | 107 | No Change |
| | 6 mo. | 58 | 54 | +0.60 | 0.0 | 12,300 | 88 | 615,100 | 101 | No Change |
| | 1 yr. | 59 | 57 | +0.65 | −0.57 | 11,800 | 85 | 579,000 | 95 | No Change |
| | | | | MEDIA - 15% Hydrochloric Acid | | TEMP. - 150° F. | | | | |
| A | 1 mo. | 50 | 49 | +0.47 | 0 | 14,200 | 71 | 668,800 | 95 | No Change |
| | 3 mo. | 55 | 54 | +0.51 | 0 | 13,700 | 68 | 590,700 | 81 | No Change |
| | 6 mo. | 58 | 55 | +0.81 | +0.31 | 13,700 | 68 | 637,000 | 88 | No Change |
| | 1 yr. | 60 | 57 | +0.63 | −0.62 | 14,000 | 70 | 571,000 | 78 | No Change |
| B | 1 mo. | 54 | 46 | −0.05 | −0.63 | 14,600 | 105 | 577,700 | 95 | No Change |
| | 3 mo. | 56 | 49 | −0.23 | −0.42 | 13,800 | 99 | 633,300 | 104 | No Change |
| | 6 mo. | 58 | 52 | +0.04 | −0.62 | 12,500 | 90 | 562,900 | 92 | No Change |
| | 1 yr. | 60 | 53 | −0.02 | −0.30 | 12,500 | 90 | 523,300 | 86 | No Change |
| | | | | MEDIA - 5% Nitric Acid | | TEMP. - 150° F. | | | | |
| A | 1 mo. | 52 | 49 | −0.49 | −0.34 | 12,500 | 63 | 583,300 | 80 | Discoloration Exposed Fibers Both Sides |
| | 3 mo. | 42 | 43 | −4.44 | −1.74 | 15,700 | 78 | 589,100 | 51 | Same as 1 month |
| | 6 mo. | 50 | 47 | −5.37 | −3.08 | 13,723 | 69 | 556,000 | 76 | Same as 1 month |
| | 1 yr. | 50 | 47 | −3.69 | +1.63 | 10,100 | 50 | 438,600 | 60 | Same as 1 month |
| B | 1 mo. | 54 | 48 | −0.77 | −0.84 | 18,600 | 134 | 671,700 | 110 | Same as 1 month |

TABLE I-continued

| Binder | Expo. | Barcol | R/S | % Wt. Ch. | % Swell | Flex. Str. | % Ret. | Flex. Mod. | % Ret. | Appearance |
|---|---|---|---|---|---|---|---|---|---|---|
| | 3 mo. | 49 | 43 | −2.55 | −2.07 | 12,300 | 88 | 602,500 | 99 | Same as 1 month |
| | 6 mo. | 49 | 41 | −3.24 | −1.81 | 15,468 | 111 | 755,000 | 124 | Same as 1 month |
| | 1 yr. | 50 | 40 | −2.65 | −0.63 | 10,900 | 78 | 524,300 | 86 | Same as 1 month |
| | MEDIA - 25% Acetic Acid  TEMP. - 150° F. |
| A | 1 mo. | 52 | 47 | +1.26 | +0.94 | 15,300 | 77 | 628,500 | 86 | No Change |
| | 3 mo. | 50 | 50 | +2.21 | +1.17 | 13,500 | 67 | 592,400 | 51 | No Change |
| | 6 mo. | 53 | 50 | +3.17 | +3.92 | 13,409 | 67 | 535,000 | 74 | Fiber Bloom |
| | 1 yr. | 52 | 50 | +3.92 | +2.65 | 11,700 | 59 | 510,600 | 70 | Fiber Bloom |
| B | 1 mo. | 50 | 44 | +0.88 | 0 | 15,500 | 112 | 634,500 | 104 | No Change |
| | 3 mo. | 52 | 48 | +1.61 | +0.62 | 17,900 | 129 | 709,000 | 116 | 5 Tiny Blisters |
| | 6 mo. | 52 | 48 | +2.52 | +2.11 | 13,400 | 96 | 555,500 | 91 | Tiny Blisters |
| | 1 yr. | 50 | 48 | +2.92 | +2.39 | 12,400 | 90 | 496,900 | 81 | Fine Cracking |
| | MEDIA - 15% Phosphoric Acid  TEMP. - 150° F. |
| A | 1 mo. | 43 | 47 | +1.49 | +1.02 | 14,200 | 71 | 621,800 | 85 | No Change |
| | 3 mo. | 51 | 49 | +2.61 | +1.86 | 13,500 | 67 | 587,400 | 81 | No Change |
| | 6 mo. | 52 | 51 | +2.96 | +2.52 | 10,900 | 55 | 529,800 | 73 | No Change |
| | 1 yr. | 53 | 52 | +1.89 | +1.0 | 10,700 | 54 | 607,800 | 84 | Hair Line Cracking |
| B | 1 mo. | 49 | 45 | +1.15 | +0.63 | 17,700 | 127 | 672,900 | 110 | No Change |
| | 3 mo. | 48 | 43 | +1.95 | +1.25 | 16,600 | 119 | 673,000 | 110 | 2 Tiny Blisters |
| | 6 mo. | 56 | 50 | +2.41 | +2.99 | 13,148 | 95 | 651,000 | 100 | 2 Tiny Blisters |
| | 1 yr. | 58 | 52 | +1.69 | +4.60 | 12,900 | 93 | 679,800 | 111 | Sl. Blister |
| | MEDIA - 5% Sodium Hydroxide  TEMP. - 150° F. |
| A | 1 mo. | 48 | 50 | +1.31 | +0.56 | 15,800 | 79 | 594,800 | 82 | No Change |
| | 3 mo. | 50 | 48 | +3.06 | +2.57 | 13,600 | 68 | 600,600 | 83 | Many Sm. Blisters |
| | 6 mo. | 52 | 50 | +2.99 | +1.87 | 11,721 | 59 | 580,000 | 80 | Many Sm. Blisters |
| | 1 yr. | 53 | 51 | +3.00 | +6.04 | 10,200 | 51 | 540,300 | 75 | Fiber Bloom |
| B | 1 mo. | 54 | 50 | +1.12 | +0.97 | 19,900 | 143 | 747,500 | 123 | 4 Tiny Blist. S Side |
| | 3 mo. | 51 | 46 | +1.87 | +1.14 | 14,300 | 103 | 604,100 | 99 | 2 Tiny Blist. S Side |
| | 6 mo. | 50 | 47 | +2.27 | +1.10 | 12,400 | 89 | 573,000 | 88 | 16 Tiny Blist. R Side |
| | 1 yr. | 53 | 50 | +2.66 | +2.34 | 11,000 | 79 | 551,800 | 90 | Tiny Blisters |
| | MEDIA - Sat. Sodium Chloride  Temp. - 150° F. |
| A | 1 mo. | 54 | 52 | +0.52 | 0 | 14,800 | 74 | 668,300 | 92 | No Change |
| | 3 mo. | 55 | 54 | +0.47 | −0.60 | 13,600 | 65 | 640,100 | 88 | No Change |
| | 6 mo. | 56 | 57 | +0.46 | 0 | 14,300 | 72 | 642,200 | 88 | No Change |
| | 1 yr. | 52 | 48 | +0.06 | −3.17 | 17,200 | 86 | 684,500 | 94 | No Change |
| B | 1 mo. | 50 | 45 | −0.07 | −0.90 | 15,900 | 114 | 623,000 | 102 | No Change |
| | 3 mo. | 58 | 52 | −0.40 | −0.60 | 13,000 | 94 | 587,500 | 96 | No Change |
| | 6 mo. | 61 | 53 | −0.47 | −0.58 | 14,380 | 103 | 673,200 | 110 | No Change |
| | 1 yr. | 57 | 50 | −0.62 | +2.84 | 15,200 | 110 | 640,400 | 105 | No Change |
| | MEDIA - 10% Sodium Carbonate  TEMP. - 150° F. |
| A | 1 mo. | 48 | 48 | +1.55 | +0.63 | 12,800 | 64 | 611,500 | 84 | 3 Tiny Blisters |
| | 3 mo. | 48 | 48 | +2.50 | +1.78 | 12,900 | 64 | 570,700 | 78 | Few Tiny Blisters |
| | 6 mo. | 39 | 48 | 3.24 | +2.65 | 12,200 | 61 | 573,600 | 79 | Few Tiny Blisters |
| | 1 yr. | 48 | 48 | +2.36 | +3.42 | 11,700 | 59 | 558,700 | 77 | Blistering |
| B | 1 mo. | 51 | 43 | +1.06 | +0.71 | 14,900 | 107 | 608,500 | 100 | No Change |
| | 3 mo. | 50 | 41 | +1.98 | +0.94 | 17,100 | 123 | 674,100 | 111 | Few Tiny Blisters |
| | 6 mo. | 57 | 48 | +2.51 | +0.63 | 14,200 | 102 | 739,000 | 121 | Few Tiny Blisters |
| | 1 yr. | 57 | 48 | +2.20 | +1.81 | 12,200 | 88 | 639,700 | 105 | Tiny Blisters |
| | MEDIA - Ethanol  TEMP. - 150° F. |
| A | 1 mo. | 43 | 45 | +1.62 | 0 | 14,100 | 71 | 609,900 | 84 | No Change |
| | 3 mo. | 42 | 41 | +1.13 | +1.75 | 16,700 | 84 | 526,100 | 72 | Numerous Tiny Blisters |
| | 6 mo. | 42 | 42 | +3.27 | 4.31 | 13,700 | 64 | 464,900 | 64 | Some Edge Cracking |
| | 1 yr. | 38 | 38 | +4.61 | +7.64 | 12,200 | 61 | 319,700 | 44 | Numerous Fine Cracking |
| B | 1 mo. | 38 | 32 | −0.88 | 0 | 20,400 | 147 | 695,900 | 114 | No Change |
| | 3 mo. | 40 | 34 | +0.57 | +3.09 | 15,400 | 111 | 430,200 | 70 | No Change |
| | 6 mo. | 43 | 35 | +4.08 | +6.29 | 13,300 | 96 | 437,200 | 72 | Sl. Fiber Bloom |
| | 1 yr. | 37 | 34 | +4.67 | +8.97 | 14,600 | 105 | 432,500 | 71 | Cracking |
| | MEDIA - 5% Aluminum Potassium Sulfate  TEMP. - 150° F. |
| A | 1 mo. | 46 | 48 | +1.94 | +1.37 | 17,100 | 86 | 674,700 | 93 | Tiny Blisters S Side |
| | 3 mo. | 48 | 51 | +3.08 | +2.60 | 14,000 | 70 | 592,100 | 81 | No Change |
| | 6 mo. | 50 | 50 | 3.45 | 2.99 | 10,800 | 54 | 516,700 | 71 | No Change |
| | 1 yr. | 43 | 47 | +3.49 | +4.45 | 11,000 | 55 | 509,800 | 70 | Dulling |
| B | 1 mo. | 48 | 41 | +1.20 | +0.88 | 14,700 | 106 | 595,900 | 98 | No Change |
| | 3 mo. | 50 | 42 | +2.73 | +1.99 | 13,000 | 94 | 607,100 | 99 | No Change |
| | 6 mo. | 52 | 40 | 3.96 | 4.05 | 13,300 | 96 | 634,500 | 104 | Many Small |

TABLE I-continued

| Binder | Expo. | Barcol | R/S | % Wt. Ch. | % Swell | Flex. Str. | % Ret. | Flex. Mod. | % Ret. | Appearance |
|---|---|---|---|---|---|---|---|---|---|---|
| | | | | | | | | | | Blisters |
| | 1 yr. | 43 | 35 | +4.30 | +5.49 | 11,600 | 84 | 535,900 | 88 | Tiny Blisters |
| | | | | MEDIA - Methyl Ethyl Ketone | | TEMP. - 150° F. | | | | |
| A | 1 mo. | 32 | 30 | +2.33 | +3.39 | 12,800 | 64 | 508,500 | 70 | No Change |
| | 3 mo. | 37 | 33 | +11.48 | +15.00 | 12,000 | 60 | 374,600 | 51 | Sl. Fiber Bloom & Edge Cracking |
| | 6 mo. | 39 | 37 | 9.87 | 12.89 | 10,300 | 52 | 306,200 | 42 | Sl. Fiber Bloom & Edge Cracking |
| | 1 yr. | 35 | 33 | +10.62 | +15.03 | 12,800 | 64 | 340,700 | 47 | Fiber Bloom & Edge Cracking |
| B | 1 mo. | 25 | 14 | +5.49 | +8.95 | 14,000 | 101 | 436,600 | 72 | Sl. Edge Cracking |
| | 3 mo. | 27 | 21 | +10.55 | +16.68 | 12,300 | 88 | 356,000 | 58 | Same as 1 month |
| | 6 mo. | 40 | 20 | 11.83 | 16.25 | 12,200 | 88 | 350,400 | 57 | Same as 1 month |
| | 1 yr. | 32 | 29 | +10.28 | +20.40 | 13,100 | 95 | 353,000 | 58 | Same as 1 month |
| | | | | MEDIA - Ethyl Acetate | | TEMP. - 150° F. | | | | |
| A | 1 mo. | 36 | 38 | +0.45 | +1.92 | 13,400 | 67 | 563,500 | 77 | Sl. Fiber Bloom |
| | 3 mo. | 38 | 37 | +5.64 | +5.56 | 13,100 | 65 | 363,400 | 50 | Fiber Bloom, Edge Cracking |
| | 6 mo. | 40 | 37 | 8.31 | 10.63 | 11,100 | 56 | 322,900 | | Fiber Bloom Edge Cracking |
| | 1 yr. | NO DATA | | — | — | — | — | — | — | NO DATA |
| B | 1 mo. | 30 | 12 | +1.75 | +3.52 | 12,200 | 88 | 372,900 | 61 | No Change |
| | 3 mo. | 31 | 26 | +9.32 | +10.86 | 12,300 | 88 | 376,800 | 62 | Sl. Fiber Bloom, Edge Cracking |
| | 6 mo. | 38 | 30 | 10.49 | 12.85 | 9,849 | 71 | 355,000 | 58 | Sl. Fiber Bloom, Edge Cracking |
| | 1 yr. | 30 | 27 | +8.08 | +16.31 | 11,800 | 85 | 344,000 | 59 | Fiber Bloom |
| | | | | MEDIA - Monochlorobenzene | | TEMP. - 150° F. | | | | |
| A | 1 mo. | 40 | 39 | 2.21 | +0.33 | 13,600 | 68 | 567,500 | 78 | Slight Dulling |
| | 3 mo. | 41 | 46 | +2.29 | +3.25 | 14,400 | 72 | 467,300 | 64 | Sl. Fiber Bloom |
| | 6 mo. | 43 | 48 | 4.34 | 4.32 | 13,417 | 67 | 451,000 | 62 | Sl. Fiber Bloom |
| | 1 yr. | 38 | 39 | +7.00 | +8.91 | 13,300 | 66 | 415,900 | 57 | Sl. Fiber Bloom |
| B | 1 mo. | 31 | 24 | +3.27 | +4.00 | 18,100 | 130 | 636,600 | 104 | No Change |
| | 3 mo. | 38 | 26 | +8.60 | +8.57 | 12,300 | 88 | 374,400 | 61 | Sl. Fiber Bloom |
| | 6 mo. | 41 | 30 | 13.04 | 13.98 | — | — | — | — | Sl. Edge Cracking |
| | 1 yr. | 37 | 34 | +15.27 | +13.56 | 15,500 | 112 | 481,400 | 79 | Sl. Edge Cracking |
| | | | | MEDIA - Perchloroethylene | | TEMP. - 150° F. | | | | |
| A | 1 mo. | 48 | 53 | −0.17 | +0.33 | 19,700 | 99 | 775,200 | 107 | No Change |
| | 3 mo. | 54 | 54 | −1.07 | −1.21 | 14,800 | 74 | 674,400 | 93 | No Change |
| | 6 mo. | 57 | 60 | −2.25 | −1.52 | 14,200 | 71 | 689,000 | 94 | No Change |
| | 1 yr. | 52 | 57 | −2.00 | −0.89 | 15,500 | 77 | 749,100 | 103 | No Change |
| B | 1 mo. | 50 | 47 | −0.39 | −0.32 | 15,800 | 114 | 719,000 | 118 | No Change |
| | 3 mo. | 54 | 51 | −1.90 | −2.77 | 12,000 | 86 | 639,700 | 105 | Sl. Pitting on Edges |
| | 6 mo. | 58 | 55 | −2.73 | −1.34 | 14,500 | 104 | 688,100 | 113 | Sl. Pitting on Edges |
| | 1 yr. | 53 | 49 | −3.08 | −1.97 | 16,200 | 117 | 762,200 | 125 | Dulling Rough Side |
| | | | | MEDIA - n-Heptane | | TEMP. - 150° F. | | | | |
| A | 1 mo. | 54 | 52 | −0.51 | −1.25 | 15,900 | 80 | 650,500 | 89 | No Change |
| | 3 mo. | 58 | 56 | −2.06 | −1.85 | 13,400 | 67 | 705,900 | 97 | No Change |
| | 6 mo. | 65 | 63 | −2.72 | −2.23 | 15,100 | 76 | 724,900 | 100 | No Change |
| | 1 yr. | 57 | 56 | −3.04 | −2.44 | 16,900 | 97 | 665,700 | 96 | No Change |
| B | 1 mo. | 53 | 49 | −1.11 | −1.22 | 13,300 | 96 | 668,400 | 110 | No Change |
| | 3 mo. | 62 | 54 | −3.14 | −2.68 | 17,200 | 124 | 535,700 | 88 | No Change |
| | 6 mo. | 65 | 62 | −3.81 | −2.42 | 18,700 | 135 | 882,500 | 145 | No Change |
| | 1 yr. | 57 | 53 | −4.41 | −1.78 | 15,600 | 178 | 815,600 | 112 | Dulling Rough Side |
| | | | | MEDIA - Kerosene | | TEMP. - 150° F. | | | | |
| A | 1 mo. | 51 | 53 | −0.12 | −0.30 | 14,400 | 72 | 653,100 | 90 | No Change |
| | 3 mo. | 57 | 54 | −1.22 | −1.15 | 17,300 | 87 | 719,600 | 99 | No Change |
| | 6 mo. | 52 | 59 | −1.30 | −1.57 | 13,200 | 66 | 701,900 | 96 | No Change |
| | 1 yr. | 55 | 56 | −1.80 | −1.65 | 11,400 | 57 | 631,000 | 87 | No Change |
| B | 1 mo. | 51 | 47 | −0.41 | −0.33 | 18,500 | 133 | 772,300 | 127 | No Change |
| | 3 mo. | 54 | 54 | −2.20 | −2.11 | 14,300 | 103 | 701,900 | 115 | No Change |
| | 6 mo. | 58 | 58 | −2.23 | −1.92 | 19,100 | 137 | 801,300 | 133 | No Change |
| | 1 yr. | 52 | 49 | −3.00 | −0.79 | 15,500 | 112 | 622,400 | 102 | Dulling Rough Side |
| | | | | MEDIA - D.I. Water | | TEMP. - 150° F. | | | | |
| A | 1 mo. | 46 | 47 | +1.55 | +0.93 | 14,300 | 42 | 592,900 | 81 | No Change |
| | 3 mo. | 47 | 49 | +2.90 | +2.62 | 14,500 | 72 | 597,100 | 82 | No Change |
| | 6 mo. | 53 | 50 | +3.46 | +2.81 | 11,628 | 58 | 557,000 | 77 | No Change |
| | 1 yr. | 48 | 45 | +2.62 | +2.38 | 11,400 | 57 | 634,000 | 87 | Sl. Fiber Bloom |
| B | 1 mo. | 43 | 41 | +1.25 | +0.56 | 17,300 | 124 | 666,400 | 109 | No Change |
| | 3 mo. | 48 | 44 | +2.58 | +2.38 | 14,000 | 101 | 570,300 | 93 | No Change |
| | 6 mo. | 50 | 47 | +3.84 | 3.40 | 11,700 | 84 | 538,300 | 88 | No Change |
| | 1 yr. | 48 | 42 | +3.76 | +4.09 | 9,900 | 72 | 449,300 | 74 | No Change |
| | | | | MEDIA - Toluene | | TEMP. - 150° F. | | | | |
| A | 1 mo. | 47 | 50 | 0 | −0.32 | 12,500 | 63 | 625,800 | 86 | No Change |

TABLE I-continued

| Binder | Expo. | Barcol | R/S | % Wt. Ch. | % Swell | Flex. Str. | % Ret. | Flex. Mod. | % Ret. | Appearance |
|---|---|---|---|---|---|---|---|---|---|---|
|  | 3 mo. | 51 | 54 | −0.74 | 0 | 14,700 | 74 | 627,900 | 86 | Fiber Trailing |
|  | 6 mo. | 52 | 58 | −0.76 | 0 | 12,624 | 63 | 611,000 | 84 | Bad Filter Trailing |
|  | 1 yr. | 45 | 53 | −0.53 | +0.60 | 15,900 | 80 | 661,500 | 91 | Severe Fiber Trailing |
| B | 1 mo. | 42 | 40 | −0.33 | −0.31 | 14,000 | 101 | 653,600 | 107 | No Change |
|  | 3 mo. | 49 | 44 | −1.12 | −0.29 | 12,900 | 93 | 586,500 | 96 | No Change |
|  | 6 mo. | 50 | 44 | −0.64 | +1.39 | 16,600 | 119 | 618,600 | 101 | No Change |
|  | 1 yr. | 38 | 38 | +0.77 | +4.70 | 14,300 | 103 | 615,600 | 101 | No Change |

EXAMPLE 2

Reinforced glass test panels were fabricated as described above using as the fibrous reinforcement glass fibers as shown in Table II. The panels were tested by Standard Test Methods ASTM C-581 (for corrosion resistance) and ASTM D-790 (for strength).

Binder A and Binder B were the same as above. A catalyst consisting of 1 part of dimethyl phthalate and 7 parts of phthaloyl chloride was used for Binder A in an amount of 3.25 parts per hundred parts of binder and for Binder B in an amount of 2.5 parts per hundred parts of binder.

The results are shown in Table II.

TABLE II

|  | Binder A | Binder B |
|---|---|---|
| Flexural Strength | 19,185 | 13,900 |
| Flexural Modulus × $10^5$ | 638,000 | 610,000 |
| Glass | 1 | 1 |
| Flexural Strength | 22,238 | 19,176 |
| Flexural Modulus × $10^5$ | 680,000 | 581,000 |
| Glass | 2 | 3 |
| Flexural Strength | 20,626 | 22,097 |
| Flexural Modulus × $10^5$ | 601,000 | 712,000 |
| Glass | 4 | 5 |
| Flexural Strength | 18,164 | 19,514 |
| Flexural Modulus × $10^5$ | 743,000 | 764,000 |
| Glass | 6 | 7 |
| Flexural Strength | 19,281 | 22,516 |
| Flexural Modulus × $10^5$ | 742,000 | 725,000 |
| Glass | 8 | 9 |

In the above Table II, the glass reinforcement fibers were as follows:

Glass 1 is fiberglass available commercially from Pittsburgh Plate Glass Company under the trade designation, PPG/ABM containing 28% glass fibers by weight.

Glass 2 is fiberglass available commercially from Owens Corning Company under the trade designation, OCF 720 containing 24.6% glass fibers by weight.

Glass 3 is fiberglass available commercially from Owens Corning Company under the trade designation, OCF 720 containing 26.5% glass fibers by weight.

Glass 4 is fiberglass available commercially from Owens Corning Company under the trade designation, OCF 740 containing 27.5% glass fibers by weight.

Glass 5 is fiberglass available commercially from Owens Corning Company under the trade designation, OCF 740 containing 26.3% glass fibers by weight.

Glass 6 is fiberglass available commercially from Certainteed Company under the trade designation, CT-M 123 containing 27.3% glass fibers by weight.

Glass 7 is fiberglass available commercially from Certainteed Company under the trade designation, CT-M 123 containing 27.7% glass fibers by weight.

Glass 8 is fiberglass available commercially from Certainteed Company under the trade designation, CT-M 113 containing 26.9% glass fibers by weight.

Glass 9 is fiberglass available commercially from Certainteed Company under the trade desgination, CT-M 113 containing 28.8% glass fibers by weight.

EXAMPLE 3

Following the test procedure described in Example 2, the data set forth in Table III was obtained using different binder systems.

TABLE III

|  | % By Weight | | | |
|---|---|---|---|---|
| Binder A | 100 | — | — | — |
| Binder B | — | 95 | 90 | 75 |
| Hydroxymethylfurfural | — | 5 | 10 | — |
| Furfuryl Alcohol | — | — | — | 25 |
| Phthaloyl Chloride Catalyst | 3.25 | 2.5 | 2.5 | 2.5 |
| Glass Reinforcement* | 1 | 1 | 1 | 1 |
| Flexural Strength (psi) | 19,054 | 17,487 | 14,972 | 18,201 |
| Flexural Modulus × $10^5$ | 6.93 | 7.09 | 6.52 | 6.14 |

*See Table II

EXAMPLE 4

Following the test procedures of Example 2, the data set forth in Table IV was obtained with two different glass fiber reinforcement materials and two binder systems.

TABLE IV

| Binder A | 100 | 100 | — |
|---|---|---|---|
| Binder B | — | — | 90 |
| Hydroxymethylfurfural | — | — | 10 |
| Furfuryl Alcohol | — | — | — |
| Phthaloyl chloride | 3.25 | 3.25 | 2.5 |
| Glass Reinforcement* | 1 | 1 | 1 |
| Flexural Strength | 19,054 | 23,209 | 22,232 |
| Flexural Modulus × $10^5$ | 6.93 | 7.31 | 7.36 |

*See Table II

EXAMPLE 5

Glass reinforced test panels were prepared as above and tested over a three month period in accordance with the test procedure of ASTM-C-581. The test results are reported in Table V.

TABLE V

| Media at 150° F. | | | | | |
|---|---|---|---|---|---|
| Sulfuric Acid 25% | Hydrochloric Acid, 15% | N—Heptane | Kerosine | Toluene | Water, D.I. |

TABLE V-continued

| Binder Systems | FS | % RT | FS | % RT | FS | % RT | FS | % RT | FS | % RT | FS | % RT |
|---|---|---|---|---|---|---|---|---|---|---|---|---|
| A Glass 1 | 15,934 | 90 | 15,377 | 87 | 19,421 | 110 | 15,444 | 87 | 12,064 | 68 | 14,140 | 80 |
| B Glass 4 | 21,943 | 110 | 19,265 | 97 | 21,374 | 108 | 21,618 | 109 | 18,827 | 95 | 16,935 | 85 |
| B Glass 7 | 8,572 | 105 | 12,321 | 70 | 18,939 | 107 | 12,635 | 71 | 15,413 | 87 | 14,118 | 80 |

| | Media at 150° F. | | | | | | | | | |
|---|---|---|---|---|---|---|---|---|---|---|
| | Monochlorobenzene | | Ethyl Acetate | | Methylethyl Ketone | | Sodium hydroxide | | Sodium chloride sat. | |
| Binder Systems | FS | % RT | FS | % RT | FS | % RT | FS | % RT | FS | % RT |
| A Glass 1 | 14,520 | 82 | 13,602 | 77 | 14,977 | 85 | 11,636 | 66 | 16,218 | 92 |
| B Glass 4 | 16,741 | 84 | 21,086 | 106 | 14,725 | 74 | 16,370 | 82 | 20,210 | 102 |
| B Glass 7 | 15,445 | 87 | 16,999 | 96 | 13,330 | 75 | 15,055 | 85 | 16,454 | 93 |

Test Method — ASTM C-581
Test duration — 3 Months
FS = Flexural strength by ASTM D-790
% RT = % retention of flexural strength
Binder A — was catalyzed with 3.25 parts per hundred of catalyst described in Example 2
Binder B — was catalyzed with 2.5 parts per hundred of catalyst described in Example 2

EXAMPLE 6

Six castings were made of each of the following formulations:

| | Series I | Series II | Series III |
|---|---|---|---|
| Binder B | 90 | 90 | — |
| Bis-hydroxymethyl-furfuryl | — | — | 90 |
| Hydroxymethylfurfural | 10 | 10 | 10 |
| Catalyst (1 part dimethyl phthalate, 7 parts phathaloyl chloride) | 3 | 3 | 2 |
| Carbon flour | — | 20 | — |

The above formulations were cast and post-cured for 1 hour at 140° F., 2 hours at 180° F. and 1 hour at 200° F. The strengths which the castings possessed were determined by making a so-called "biscuit" or briquette, that is, a formation shaped in a characteristic way (a "dog bone" shape) and bonded by the binder being tested. After the so-called biscuit was formed, it was placed in a machine adapted to determine what the tensile and ultimate yield strengths of the part thus formed were. The shape of a typical briquette or biscuit is well known to those skilled in the art and accordingly, the characteristics thereof are not discussed further herein; for example, however, reference is made to such typical biscuit in a book entitled *Steel Foundry Practice*, by J. H. Hall, (Penton Publishing Co., Cleveland, Ohio, 1950) where such unit is shown and described on page 8.

The flex tests were conducted in accordance with procedure ASTM D-790 and the strength test results are shown below:

TABLE VI

| | Series I | Series II | Series III |
|---|---|---|---|
| Flexural Strength, psi | 5116 | 6038 | 2632 |
| Flexural Modulus, psi | 450,000 | 450,000 | 560,000 |

In fabricating composite articles, a silane glass or silica or other adhesion promoter can be used with binders of this invention in an amount ranging from about 0.1% to 3% based on the weight of the binder. Silane adhesion promoters are well known in the art and include for example, gamma-mercaptopropyltrimethoxysilane, N-beta-(aminoethyl)-gamma-aminopropyltrimethoxysilane, beta-(3,4-epoxycyclohexyl)ethyltrimethoxysilane, gamma-glycidoxypropyltrimethoxysilane, gamma-aminopropyltriphenoxysilane, gamma-aminopropyltribenzoyoxysilane, gamma-aminopropyltrifurfuroxysilane, gamma-aminopropyltri(o-chlorophenoxy)silane, gamma-aminopropyltri(p-chlorophenoxy)silane, gamma-aminopropyltri(tetrahydrofurfuroxy)silane, methyl[2-gamma-triethoxysilypropylamino)ethyl amino]3-propionate in methanol, modified amino-organosilane, Ureido-silane, mercaptoethyltriethoxysilane, chloropropyltrimethoxysilane, vinyltrichlorosilane, vinyltriethoxysilane, vinyltrimethoxysilane, gamma-methacryloxypropyltrimethoxysilane, gamma-methacryloxypropyltri(2-methoxyethoxy)silane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-amino-propyltrimethoxysilane.

Binder compositions in accordance with this invention are particularly advantageous for fabrication of fibrous reinforced articles which in use are exposed to corrosive conditions. However, as shown heretofore, the binders impart excellent strength characteristics and can be used advantageously as binders in the manufacture of pressure molded medium or high density composite articles such as particle board, wafer board, oriented fiber board, matboard, hardboard, pressboard, fiberglass board, etc. and in the manufacture of low density non-molded composite articles such as acoustical tile and thermal insulating mats or boards. Various methods of manufacturing the pressure molded high density composite articles and non-molded low density composites are known in the art using as matrix-forming materials a resinous binder and glass fiber, woody particles such as sawdust, bark, shavings and chips as well as other fibrous lignocellulosic materials such as straw, bagasse, corn stalks, cork and the like. The binder compositions of this invention can be used in accordance with the known manufacturing procedures.

Those modifications and equivalents which fall within the spirit of the invention are to be considered a part thereof.

What is claimed is:

1. In the fabrication of composite articles wherein a binder is employed, the improvement which consists in employing as the binder a resinous furan binder diluted with hydroxymethylfurfural in an amount of about 5 to 25% by weight of the binder composition.

2. In the fabrication of fiber reinforced composite articles wherein a binder is employed, the improvement which consists in employing as the binder a resinous furan binder diluted with hydroxymethylfurfural in an amount of about 5 to 25% by weight of the binder composition.

3. In the fabrication of glass fiber reinforced articles wherein a binder is employed, the improvement which consists in employing as the binder a resinous furan binder diluted with hydroxymethylfurfural in an amount of about 5 to 25% by weight of the binder composition.

* * * * *